(12) United States Patent
Lescroart

(10) Patent No.: US 11,937,582 B2
(45) Date of Patent: Mar. 26, 2024

(54) DEVICE FOR DISTRIBUTING FOOD TO ANIMALS

(71) Applicant: PIPOLINO, Villeneuve-Loubet (FR)

(72) Inventor: Pascal Lescroart, Villeneuve-Loubet (FR)

(73) Assignee: PIPOLINO, Villeneuve-Loubet (FR)

( * ) Notice: Subject to any disclaimer, the term of this patent is extended or adjusted under 35 U.S.C. 154(b) by 370 days.

(21) Appl. No.: 17/440,483

(22) PCT Filed: Mar. 16, 2020

(86) PCT No.: PCT/EP2020/057093
§ 371 (c)(1),
(2) Date: Sep. 17, 2021

(87) PCT Pub. No.: WO2020/187833
PCT Pub. Date: Sep. 24, 2020

(65) Prior Publication Data
US 2022/0151199 A1 May 19, 2022

(30) Foreign Application Priority Data
Mar. 18, 2019 (FR) .................................... 1902785

(51) Int. Cl.
*A01K 5/01* (2006.01)
(52) U.S. Cl.
CPC .................................. *A01K 5/0114* (2013.01)
(58) Field of Classification Search
CPC ........................... A01K 5/0114; A01K 15/025
USPC ..................................................... 119/51.01
See application file for complete search history.

(56) References Cited

U.S. PATENT DOCUMENTS

| 10,772,298 | B1* | 9/2020 | Mullin ................. A01K 5/0114 |
| 10,834,911 | B2* | 11/2020 | Hutchinson ............ A01K 97/05 |
| 2008/0083378 | A1* | 4/2008 | Pearce ................. A01K 5/0114 |
| | | | 119/707 |
| 2017/0303510 | A1* | 10/2017 | Stone .................... A01K 15/026 |
| 2022/0256808 | A1* | 8/2022 | Axelrod ............... A01K 15/026 |

FOREIGN PATENT DOCUMENTS

| DE | 29700720 U1 | 3/1997 | |
| DE | 202015106709 U1 | 1/2016 | |
| KR | 101727483 B1 * | 4/2017 | |
| WO | 0201942 A1 | 1/2002 | |
| WO | WO-2013140407 A1 * | 9/2013 | ........... A01K 15/025 |

OTHER PUBLICATIONS

International Search Report issued in corresponding International Application No. PCT/EP2020/057093, dated Jul. 9, 2020, pp. 1-2, European Patent Office, Rijswijk, Netherlands.
Written Opinion issued in corresponding International Application No. PCT/EP2020/057093, dated Jul. 9, 2020, pp. 1-7, European Patent Office, Rijswijk, Netherlands.

* cited by examiner

*Primary Examiner* — Monica L Perry
*Assistant Examiner* — Brittany A Lowery
(74) *Attorney, Agent, or Firm* — HAUPTMAN HAM, LLP

(57) ABSTRACT

A device for dispensing at least one food item to animals having a hollow inner sleeve, a hollow outer sleeve. The inner sleeve extends along a longitudinal axis within the outer sleeve so as to be coaxial with the outer sleeve, and the outer sleeve and the inner sleeve have a relative mobility. The relative mobility includes a translation along the longitudinal axis.

18 Claims, 4 Drawing Sheets

DEVICE FOR DISTRIBUTING FOOD TO ANIMALS

TECHNICAL FIELD

The invention relates to the field of feed dispensers for domestic animals. It finds a particularly advantageous application in dispensing feed, in particular dry feed (granules, seeds, flakes, bran, flour) for domestic animals, and in particular for pets.

STATE OF THE ART

There are several types of devices allowing dispensing feed to animals. The feed dispensers are often stationary, having a container containing these feed which are distributed in a bowl by actuation of a user.

However, it is known that animals, preferably domestic animals, need to perform physical efforts to stay healthy and fit. Unfortunately, they are more often attracted to food than to physical exercise.

The patent publication WO 02/01942 A1 discloses a feed dispenser for cattle, in a dosed manner.

The patent publication DE 20 2015 106709 U1 shows a toy for animals having a central volume delimited by a cylindrical wall pierced with openings.

The patent EP1887857B1 proposes a solution aimed at allowing domestic animals to exercise in order to dispense feed contained in a feed dispenser.

Indeed, the patent EP1887857B1 discloses a mobile feed dispenser. The animal can roll this dispenser on the ground in order to release the feed through orifices located on the wall of the dispenser. Thus the animal is exercising while dispensing its food on the ground.

However, this solution limits the diameter and shape of the granules to the diameter and shape of the orifices as described by the patent EP1887857B1. Yet, it is known that according to the type of animal, the weight of the animal, its diet, the granules are not all of the same size or the same shape.

An object of the present invention is therefore to provide a rolling device allowing improving the diameters and shapes of the orifices of the device in order to adapt the device to several types of granules.

Indeed, the present invention allows forcing the animal to make a physical effort to displace the device and obtain the feed.

The other objects, features and advantages of the present invention will become apparent on examining the following description and the accompanying drawings. It is understood that other advantages can be incorporated.

SUMMARY

In order to achieve this objective, according to one embodiment, the present invention provides a device for dispensing at least one food item to animals comprising:
  a hollow inner sleeve having:
    an inner surface, which delimits a storage volume, configured to receive at least one food item,
    an outer surface, which defines a first lateral wall having a first plurality of orifices opening into the storage volume,
  a hollow outer sleeve having:
    an inner surface,
    an outer surface, which defines a second lateral wall having a second plurality of orifices, in which the inner sleeve extends along a longitudinal axis within the outer sleeve so as to be coaxial with the outer sleeve, and in which the outer sleeve and the inner sleeve have a relative mobility configured to define a variable cover surface of the second plurality of orifices on the first plurality of orifices, in which the variation of said cover surface generating a variable passage surface between the storage volume and the outside of the device, characterised in that the relative mobility comprises a translation along the longitudinal axis.

Thus, the present invention proposes a device having an alternative to the variation of a passage surface between the storage volume and the outside of the device. Indeed, it proposes a relative mobility in translation of one sleeve relative to the other. This alternative is easy to use and reliable.

The present invention also relates to a method for adjusting the cover surface of the device, comprising successively at least the following steps:
  relative translation of the inner sleeve and the outer sleeve along the longitudinal axis so as to reach a position corresponding to a desired level of a cover surface,
  immobilisation of the outer sleeve in said position.

This allows the user to adjust the passage surface at the user's convenience.

Thus, by using the method for adjusting the cover surface, the user can very easily and reliably position the outer sleeve relative to the inner sleeve so as to obtain the desired cover surface. Thus it is easy for the user to adapt the cover surface of the device depending on parameters such as the shape of the feed, the size of the feed, the type of animal, the diet of the animal etc.

BRIEF DESCRIPTION OF THE FIGURES

The aims, objects, as well as the features and advantages of the invention will become more apparent from the detailed description of an embodiment thereof which is illustrated by the following accompanying drawings in which.

Figure 1:
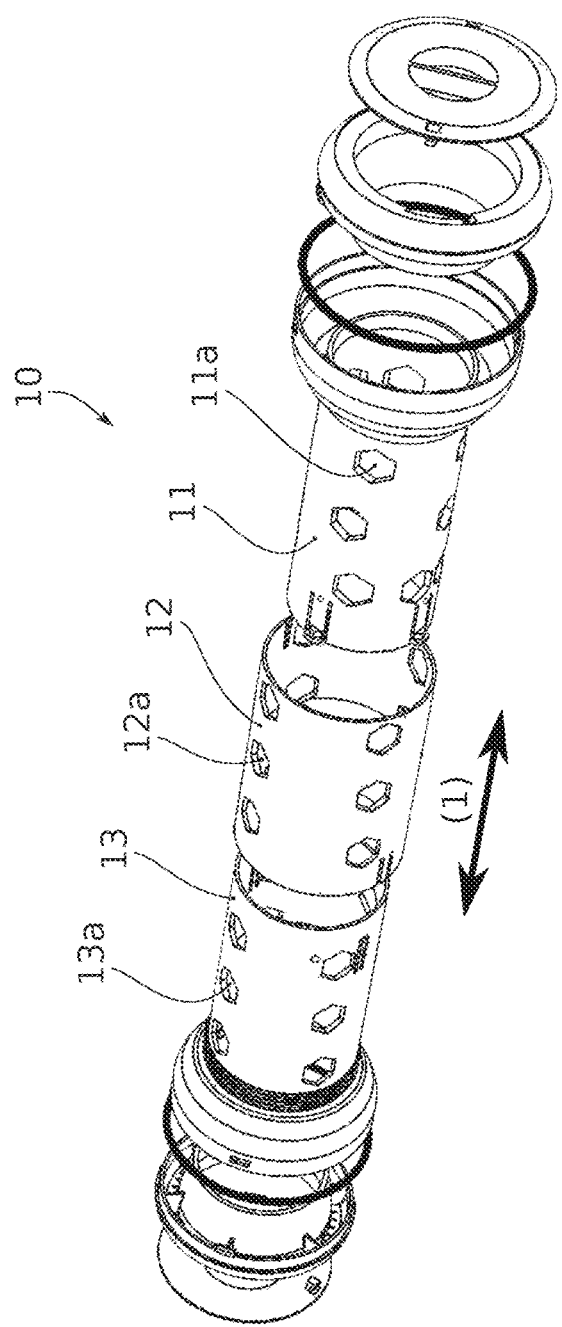
FIG. 1 represents an exploded view of the device according to one embodiment of the invention.

The drawings are given by way of example and are not limiting of the invention. They constitute schematic representations of principle intended to facilitate the understanding of the invention and are not necessarily on the scale of practical applications.

DETAILED DESCRIPTION

Before starting a detailed review of embodiments of the invention, optional features which may optionally be used in combination or alternatively are set forth below:

Advantageously, the device comprises an additional hollow sleeve, extending along the longitudinal axis and having an inner surface and an outer surface, said outer surface defining a third lateral wall having a third plurality of orifices, and in which the additional sleeve is movable in rotation relative to at least one of the inner sleeve and the outer sleeve so as to vary a cover surface of the third plurality of orifices on the first plurality of orifices and/or the second plurality of orifices.

This allows varying the diameter of the orifices and obtaining more precision in the choice of the diameter of the orifices.

Advantageously, the inner sleeve extends along the longitudinal axis within the additional sleeve so as to be coaxial with the additional sleeve, the additional sleeve extends along the longitudinal axis within the outer sleeve so as to be coaxial with the outer sleeve, such that the order of arrangement of the sleeves from the storage volume to the outside of the device is as follows: inner sleeve, additional sleeve and outer sleeve.

Advantageously, the device has a rotation guide element and a translation guide element.

This allows facilitating the manipulation of the device by the user in order to adjust the device, in particular the relative translation and the relative rotation of at least two sleeves of the device.

Advantageously, the translation guide element comprises a lumen disposed on one of the outer sleeves and the additional sleeve, and a notch disposed on the other such that the notch is intended to be displaced freely in the lumen.

This allows guiding the user in the relative translation of the outer sleeve and the inner sleeve.

Advantageously, the orifices of the plurality of orifices of at least one, and preferably each, sleeve are at least partially hexagonal in shape.

This allows the device to be compatible with dry feed of hexagonal shape and to give more freedom in the possible shapes of the cover surface.

Advantageously, the device has an element for locking the translation in at least two different relative positions of the inner sleeve and the outer sleeve.

This allows maintaining the two different relative positions of the inner sleeve and the outer sleeve.

Advantageously, the locking element has a hook on one of the outer sleeves and the additional sleeve and a plurality of detents on the other such that the outer sleeve is fastened on the additional sleeve in a stationary position through the cooperation between the hook and a detent of the plurality of detents.

Advantageously, the method for adjusting the cover surface of the device comprises an additional step of relative rotation of an additional sleeve and one of the inner sleeve and the outer sleeve so as to vary a cover surface of the third plurality of orifices on the first plurality of orifices and/or the second plurality of orifices.

This allows the user to have even more freedom to adjust the passage surface at the users convenience.

Advantageously, the passage surface between the storage volume and the outside of the device is defined by the combination of the relative rotation of the additional sleeve and one of the outer sleeve and the inner sleeve and the relative translation along the longitudinal axis of the outer sleeve and the inner sleeve.

This allows the user to have a fairly wide range of possible device configurations.

The term "cover surface" means a sum of elementary cover surfaces, said elementary cover surface being specific to the cover surface of each orifice of the plurality of orifices.

The present invention describes a device 10 for dispensing at least one food item, preferably a sufficient amount of feed necessary for the satiety of the animal. The feed are generally dry feeds, preferably in granules, such as, for example, kibble for animals. The device 10 comprises at least two sleeves 11, 12, preferably three sleeves 11, 12, 13 as represented in FIG. 1.

In the preferred case where the device 10 comprises only two sleeves 11, 12, the device 10 then comprises a hollow inner sleeve 11 and a hollow outer sleeve 12. The inner sleeve 11 and the outer sleeve 12 each have an inner surface 110, 120 and an outer surface 111, 121. The inner surface 110 of the inner sleeve 11 delimits a storage volume 100. This storage volume 100 is configured to receive at least a food item. Indeed, the at least one food item intended to feed the animal is contained in this volume 100. Preferably, the volume occupied by the at least one food item is equal to the storage volume 100. Alternatively, the volume occupied by the at least one food item is adapted by the user depending on the nutritional needs of the animal, the volume occupied by the food item is then less than the storage volume 100. Thus, with the same device 10, the user can provide a desired amount of feed into the storage volume 100. In addition, the outer surface 111 of the inner sleeve 11 and the outer surface 121 of the outer sleeve 12 define respectively a first lateral wall 112 and a second lateral wall 122. The first lateral wall 112 has a first plurality of orifices 11a opening into the storage volume 100. The second lateral wall 122 has a second plurality of orifices 12a. The inner sleeve 11 extends along a longitudinal axis 1 within the outer sleeve 12 so as to be coaxial with the outer sleeve 12. Preferably, the inner surface 120 of the outer sleeve 12 is in contact with the outer surface 111 of the inner sleeve 11.

The outer sleeve 12 and the inner sleeve 11 have a relative mobility. This relative mobility comprises a translation along the longitudinal axis 1. Advantageously, the outer sleeve 12 is moved relative to the inner sleeve 11. This relative mobility is configured to define a variable cover surface 20 of the second plurality of orifices 12a on the first plurality of orifices 11a. The variation of said cover surface 20 generates a variable passage surface 20' between the storage volume 100 and the outside of the device. The cover surface 20 and the passage surface 20' are respectively defined as the elementary sum of each cover surface 20 and each passage surface 20' of a single orifice of the second plurality 12a on the first plurality 11a. Thus, the relative mobility of a sleeve 11 or 12 relative to the other allows varying the passage surface 20' between the storage volume 100 and the outside of the device 10. Thus, according to the shape of the at least one food item contained in the storage volume 100, it is possible for the user to adjust the shape and size of the passage surface 20', which allows the at least one food item to escape from the device 10 when the animal rolls the device 10.

Very advantageously, the first plurality of orifices 11a and the second plurality of orifices 12a are configured such that there is a position called active position in which each orifice of the second plurality 12a is entirely superimposed with an orifice of the first plurality 11a, and that there is a position called passive position, in which no orifice of the second plurality 12a covers an orifice of the first plurality 11a. In addition, there is a plurality, or even an infinity of positions comprised between the passive position and the active position, in which the second plurality of orifices 12a partially covers the first plurality of orifices 11a so as to reach a position corresponding to a desired level of cover surface 20. Thus the user is free to configure the cover surface 20 as he wishes.

Alternatively, the first plurality 11a and the second plurality 12a are configured such that there is no position in which all orifices of the second plurality 12a entirely cover all orifices of the first plurality 11a. This allows only some orifices to have an elementary cover surface 20 generating an elementary passage surface 20', other orifices not having elementary passage surfaces 20'. Thus, it is possible for the user to adjust the flow rate of an amount of feed intended to escape from the device 10 when the animal rolls the device 10. Thus according to at least one of the diet of the animal, the type of animal, the size of the animal, the age of the animal, the weight of the animal, it is possible to better control the amount of feed exiting the device 10 during the use of the device 10 by the animal. The device 10 as claimed then allows both by controlling the amount of feed exiting the device and by the obligation of the animal to exercise in order to be able to release the feed, keeping the animal in good health conditions.

Preferably, the first plurality of orifices 11a and the second plurality of orifices 12a have a sufficiently large number of orifices allowing the first plurality 11a and the second plurality 12a respectively to extend over the whole of the first lateral wall 112 of the inner sleeve 11 and of the second lateral wall 122 of the outer sleeve 12. This allows the distribution of the at least one food item from the storage volume 100 to the outside of the device 10 to take place homogeneously, the at least one food item is then dispensed over the entire length and over the entire circumference of the device 10 along the longitudinal axis 1 in which it extends.

Preferably, the orifices of the plurality of orifices 11a, 12a of at least one, and preferably of each, sleeve are at least partially polygonal in shape with at least five sides, preferably at least partially hexagonal in shape. Indeed, animal feed are very often hexagonal in shape. Alternatively, the orifices of the plurality of orifices of at least one, and preferably each, sleeve are circular.

We will now describe the preferred embodiment of the present invention. According to this preferred embodiment and as described in all FIGS. 1 to 4, the device 10 comprises a hollow additional sleeve 13. This additional sleeve 13 extends, like the inner sleeve 11 and the outer sleeve 12, along the longitudinal axis 1. The additional sleeve 13 has an inner surface 130 and an outer surface 131. The outer surface 131 defines a third lateral wall 132 having a third plurality of orifices 13a.

Preferably, all possible configurations as previously described for the first plurality of orifices 11a and for the second plurality of orifices 12a are also valid for this third plurality of orifices 13a.

Figure 3:
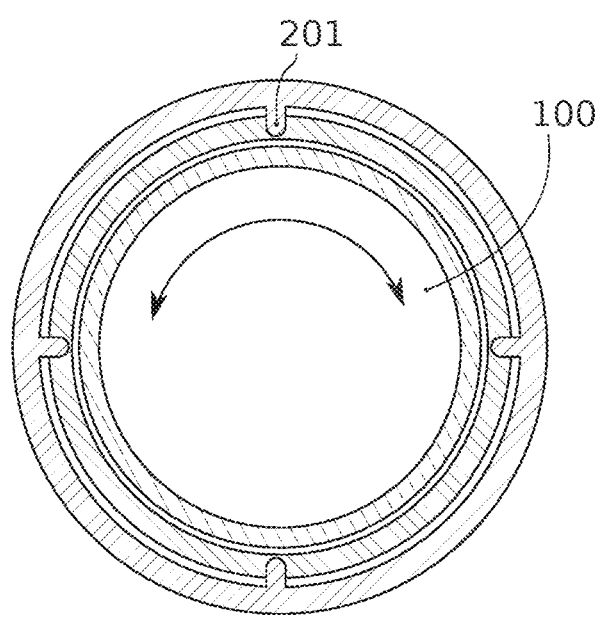
FIG. 3 represents a second sectional view of the device of FIG. 1.
Figure 4:
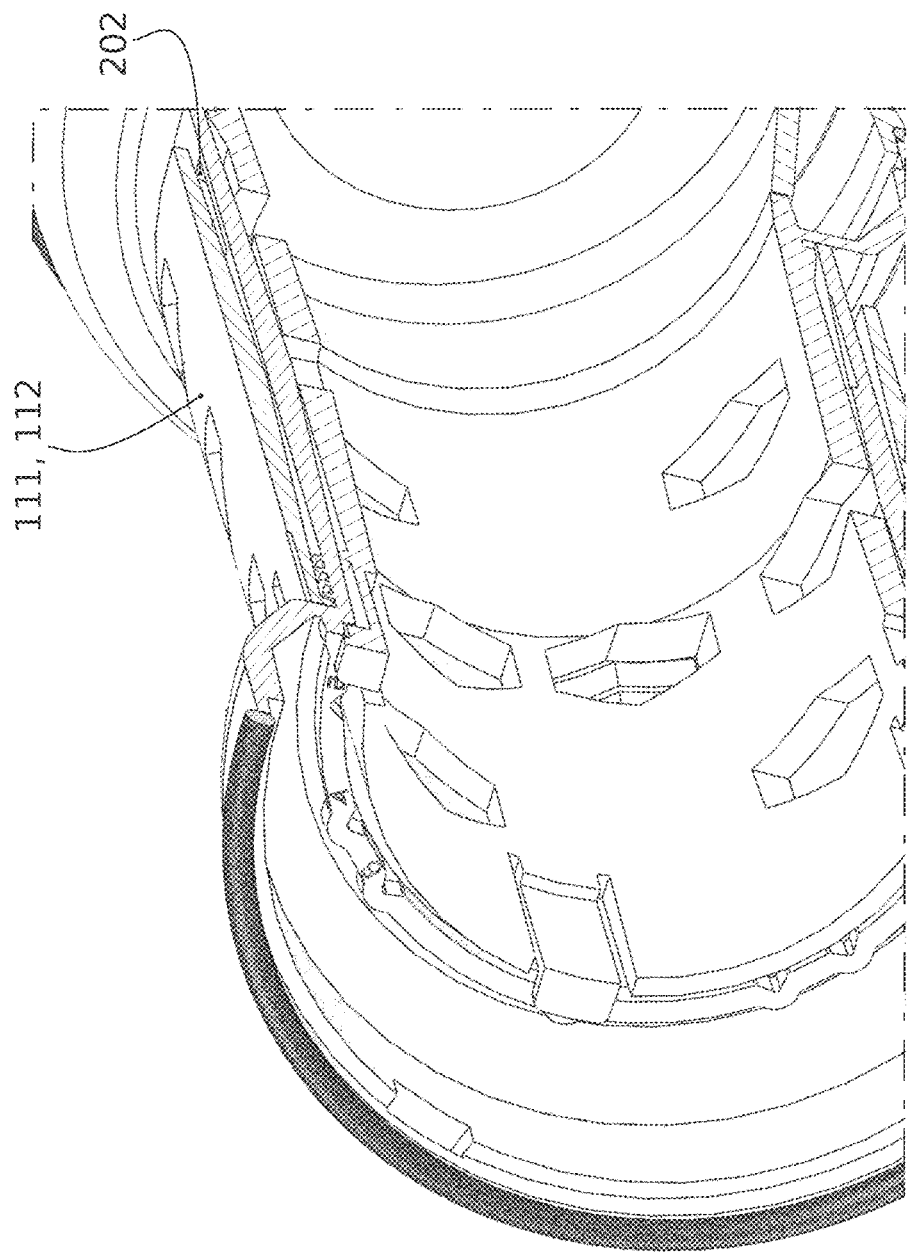
FIG. 4 represents an inclined cut-away view of the device of FIG. 1.

More than advantageously and as represented in FIG. 3, the additional sleeve 13 is rotatable movable relative to at least one of the inner sleeve 11 and the outer sleeve 12. This relative rotation generates the variation of a cover surface 20 of the third plurality of orifices 13a on the first plurality of orifices 11a and/or the second plurality of orifices 12a.

According to a very advantageous, non-limiting example and as represented in FIGS. 1 to 4, the present invention describes a device 10 in which the inner sleeve 11 extends along a longitudinal axis 1 within the additional sleeve 13 so as to be coaxial with the additional sleeve 13, the additional sleeve 13 extends along a longitudinal axis 1 within the outer sleeve 12 so as to be coaxial with the outer sleeve 12. Thus the order of arrangement of the sleeves 11, 12, 13 from the storage volume 100 to the outside of the device 10 is as follows: inner sleeve 11, additional sleeve 13 and outer sleeve 12. Thus the additional sleeve 13 is comprised between the inner sleeve 11 and the outer sleeve 12.

In this preferred embodiment, in which the device 10 comprises three sleeves 11, 12, 13, disposed as described in the previous paragraph, the outer sleeve 12 and the inner sleeve 11 still have a relative mobility which comprises a translation along the longitudinal axis 1. The additional sleeve 13 and the outer sleeve 12 have a relative mobility. The additional sleeve 13 and the inner sleeve 11 also have a relative mobility.

Figure 2:
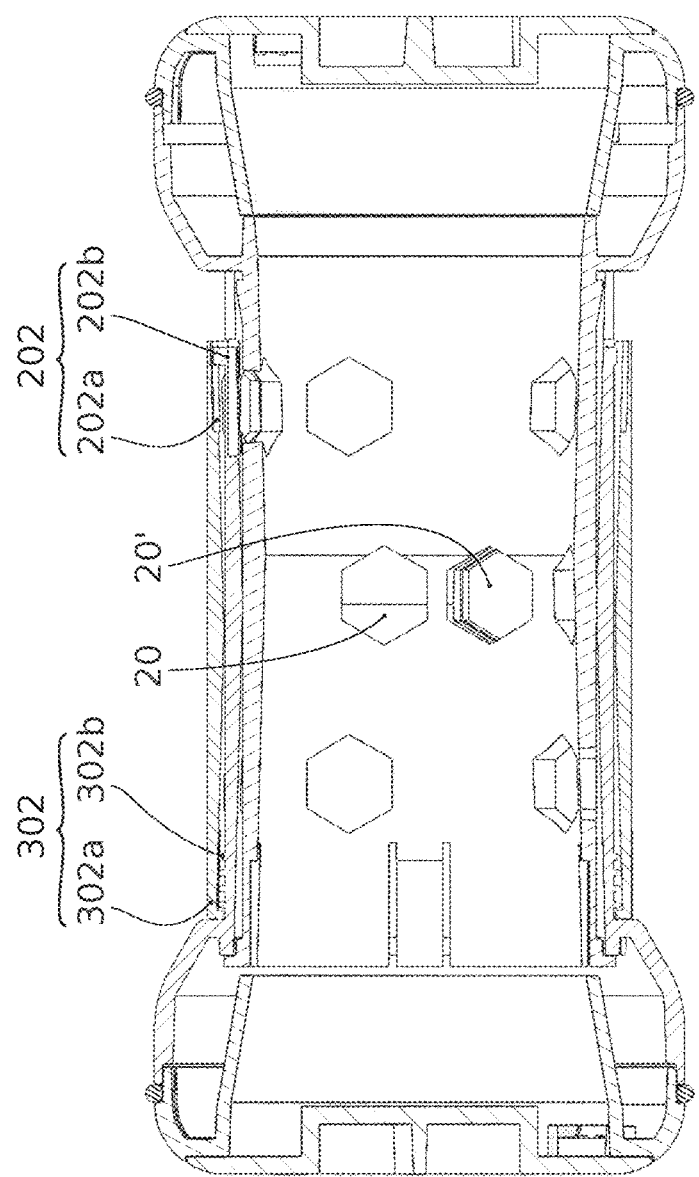
FIG. 2 represents a first sectional view of the device of FIG. 1.

FIG. 2 represents a sectional view of an embodiment of the present invention. It describes therein that the device has a rotation guide element 201. This rotation guide element 201 has a male female assembly, in which the male element is disposed on one of the outer surface 111 of the inner sleeve 11 or the inner surface 130 of the additional sleeve 13; the female element is disposed on the other surface. Thus, the user can through his hands, perform a manual relative rotation of one sleeve relative to the other. Any other means of rotation guide element is within the scope of the present invention.

FIG. 2 also describes that the device 10 has a translation guide element 202. According to a preferred but non-limiting example, the translation guide element 202 comprises a lumen 202a disposed on the lateral wall 132 of the additional sleeve 13, and a notch 202b disposed on the inner surface 120 of the outer sleeve 12, the notch 202b can then be freely displaced in the lumen 202a. A reverse arrangement of the lumen 202a and the notch 202b is also possible. This allows the user to be easily guided in the translation of the outer sleeve 12 relative to the additional sleeve 13 and consequently in the relative translation of the outer sleeve 12 and inner sleeve 11. Thus it is easy for the user to exert a translational stress on the outer surface 121 of the outer sleeve 12, no element opposes this stress that the user exerts. The outer sleeve 12 will then be immobilised when the notch 202b reaches the end of the lumen 202a. Any other means of translation guide element is within the scope of the present invention. These rotation and translation guide elements guide one of the three sleeves on one of the other sleeves.

In the alternative case and not represented in FIG. 2, where the notch 202b is located on the outer surface 131 of the additional sleeve 13 and the lumen 202a is located on the lateral wall 122 of the outer sleeve 12, it is the additional sleeve 13 which is guided in translation along the longitudinal axis 1 by the user. Thus, the user only needs to push the notch 202b to enable the movement of the additional sleeve 13 along the longitudinal axis 1.

According to an alternative but non-limiting example, in which the additional sleeve 13 is not present, the lumen 202a of the translation guide element 202 is disposed on the lateral wall 112 of the inner sleeve 11, and the notch 202b is disposed on the inner surface 120 of the outer sleeve 12. In this case, it is the outer sleeve 12 which translates relative to the inner sleeve 11. In an alternative case, the lumen 202a of the translation guide element 202 is disposed on the lateral wall 112 of the outer sleeve 12, and the notch 202b is disposed on the outer surface 111 of the inner sleeve 11 such that the user can have access to this notch 202b in order to enable the translational movement of the additional sleeve 13 relative to the outer sleeve 12.

Preferably, in order to be able to lock the relative position of the outer sleeve 12 and the inner sleeve 11 in translation, the device 10 has a translation locking element 302 in at least two different relative positions of the inner sleeve 11 and the outer sleeve 12.

For this, in the case where the device comprises only two sleeves, the locking element 302 has a hook 302a on one of the outer sleeve 12 and the inner sleeve 11 and a plurality of detents 302b on the other such that the outer sleeve 12 is fastened on the inner sleeve 11 in a stationary position through the cooperation between the hook 302a and a detent of the plurality of detents 302b.

In the preferred but non-limiting example where the additional sleeve 13 is present, the locking of the translation 302 is performed in at least two different relative positions of the additional sleeve 13 and the outer sleeve 12. It follows that the locking element 302 has a hook 302a on one of the outer sleeve 12 and the additional sleeve 13 and a plurality of detents 302b on the other such that the outer sleeve 12 is fastened on the additional sleeve 13 in a stationary position through the cooperation between the hook 302a and a detent of the plurality of detents 302b. Thus, it is easy for the user to ensure that the outer sleeve 12 is well fastened in a stationary position on one of the inner sleeve 11 or the additional sleeve 13. The user then chooses the position he wishes before using the device 10 by the animal, he ensures that it is locked by the locking element 302. Thus, when the device 10 is used by the animal, the adjustment of the relative positions of the sleeves selected by the user is locked and fixed. The blows and movements that the animal can give on the device 10 while playing with the latter do not disturb the adjustment of the device 10. In addition, the possible friction and/or impact between the device 10 and the ground do not disturb the adjustment of the device 10 either. Thus, the present invention proposes a reliable and robust animal feed dispensing device 10.

The present invention also describes a method of adjusting the cover surface 20 of the device 10. The adjustment method successively comprises a step of relative translation of the inner sleeve 11 and the outer sleeve 12 along the longitudinal axis 1 so as to reach a position corresponding to a desired level of cover surface 20, a step of immobilising the outer sleeve 12 in said position.

Optionally, it is possible to add to the adjustment process an additional step of relative rotation of an additional sleeve 13 and one of the inner sleeve 11 and the outer sleeve 12, preferably the inner sleeve 11. Thus a cover surface 20 of the third plurality of orifices 13a is varied over the first plurality of orifices 11a and/or the second plurality of orifices 12a.

Advantageously, the passage surface 20' between the storage volume 100 and the outside of the device 10 is defined by the combination of the rotation of the additional sleeve 13 around one of the outer sleeve 12 and the inner sleeve 11 and the translation along the longitudinal axis 1 of one of the outer sleeve 12 and the inner sleeve 11.

The present invention also describes the use of the device as described according to the various embodiments, comprising at least one food item in the storage volume 100 of the inner sleeve 11 in which the animal exerts an effort on the device 10, which rolls about a revolution axis being coaxial with the longitudinal axis 1 so as to release the at least one food item contained in the storage volume 100 of the inner sleeve 11 through the passage surface 20'. Thus the animal performs a physical activity to release the at least one food item, and can then feed itself, the released food then being disposed on the ground.

In the non-preferred case, where the device only comprises the inner sleeve 11 and the outer sleeve 12, all embodiments as described are valid.

Moreover, as represented in all FIGS. 1 to 4, the device 10 as claimed by the present invention has two wheels located at the ends of the sleeves 11, 12, 13 and being configured such that at least one portion of these wheels conforms to the ends of the sleeves 11, 12, 13.

Preferably, at least one of the two wheels is removable from the device 10. This allows the at least one food item to be inserted through the unobstructed opening when at least one of the two wheels is removed. Preferably, at least one of the two wheels comprises a cap which can be screwed and unscrewed in the wheel and when it is unscrewed, enables a passage between the outside of the device 10 and the storage volume 100. This allows at least one food item to be easily inserted within the storage volume 100 without having to unscrew the wheel.

More than advantageously, the two wheels are configured such that they have a height which does not enabling no contact between the outer surface 122 of the outer sleeve 12 and the ground. Thus, the device 10 easily rolls on the ground only through two wheels.

The embodiments concerning the presence of wheels on the device 10 can be combined with all embodiments as previously described, whether those having a device 10 comprising two sleeves 11, 12 or those having a device comprising three sleeves 11, 12, 13.

The invention is mainly intended for use by cats but can also be used by other animals, preferably small animals, such as, for example, puppies, small dogs, ferrets, etc.

More than advantageously, in all embodiments as previously described, the sleeves 11, 12, 13 are all of the same shape, preferably are cylindrical in shape. Alternatively, the sleeves 11, 12, 13 are rectangular in shape.

Preferably, the device 10 consists mainly of plastic materials, in particular the sleeves consist of plastic materials. Alternatively, the device 10 is used for larger animals, the device 10 can consist of materials which are more resistant than plastic, such as iron or aluminium.

The invention is not limited to the previously described embodiments and extends to all embodiments covered by the claims.

LIST OF REFERENCES

1. Longitudinal axis
10. Device
100. Storage volume
11. Inner sleeve
110. Inner surface
111. Outer surface
112. First lateral wall
11a. First plurality of through orifices
12. Outer sleeve
120. Inner surface
121. Outer surface
122. Second lateral wall
12a. Second plurality of through orifices
13. Additional sleeve
130. Inner surface
131. Outer surface
132. Lateral wall
13a. Third plurality of through orifices
20. Cover surface
20'. Passage surface
201. Rotation guide element
202. Translation guide element
202a. Lumen
202b. Notch
302. Translation locking element
302a. Hook
302b. Plurality of detents

The invention claimed is:

1. A device for dispensing at least one food item to animals comprising:
   a hollow inner sleeve having:
      an inner surface, which delimits a storage volume, configured to receive at least one food item,
      an outer surface, which defines a first lateral wall having a first plurality of orifices opening into the storage volume,
   a hollow outer sleeve having:
      an inner surface,
      an outer surface, which defines a second lateral wall having a second plurality of orifices,
   wherein the inner sleeve extends along a longitudinal axis within the outer sleeve so as to be coaxial with the outer sleeve,
   and wherein the outer sleeve and the inner sleeve have a relative mobility configured to define a variable cover surface of the second plurality of orifices on the first plurality of orifices, wherein the variation of said cover surface generating a variable passage surface between the storage volume and the outside of the device,
   wherein the relative mobility comprises a translation along the longitudinal axis,
   the device comprising an additional hollow sleeve, extending along the longitudinal axis and having an inner surface and an outer surface, said outer surface defining a third lateral wall having a third plurality of orifices, and wherein the additional sleeve is movable in rotation relative to at least one of the inner sleeve and the outer sleeve so as to vary a cover surface of the third plurality of orifices on the first plurality of orifices and/or the second plurality of orifices, the device being further such that:
      the inner sleeve extends along the longitudinal axis within the additional sleeve so as to be coaxial with the additional sleeve,
      the additional sleeve extends along the longitudinal axis within the outer sleeve so as to be coaxial with the outer sleeve such that the order of arrangement of the sleeves from the storage volume to the outside of the device is as follows:
   inner sleeve, additional sleeve and outer sleeve,
   the device further having an element for locking the translation in at least two different relative positions of the inner sleeve and the outer sleeve.

2. The device according to the preceding claim 1 which has a rotation guide element and a translation guide element.

3. The device according to the preceding claim 2, wherein the translation guide element comprises a lumen disposed on one of the outer sleeve and the additional sleeve, and a notch disposed on the other of the outer sleeve and the additional sleeve, such that the notch is intended to be displaced freely in the lumen.

4. The device according to claim 1, wherein the orifices of the plurality of orifices of at least one sleeve are at least partially hexagonal in shape.

5. The device according to claim 1, wherein the locking element has a hook on one of the outer sleeve and the additional sleeve and a plurality of detents on the other of the outer sleeve and the additional sleeve such that the outer sleeve is fastened on the additional sleeve in a stationary position through the cooperation between the hook and a detent of the plurality of detents.

6. A method for adjusting the cover surface of the device according to claim 1, comprising successively at least the following steps:
   relative translation of the inner sleeve and the outer sleeve along the longitudinal axis so as to reach a position corresponding to a desired level of a cover surface,
   immobilisation of the outer sleeve in said position.

7. The method according to claim 6 comprising an additional step of relative rotation of an additional sleeve and one of the inner sleeve and the outer sleeve so as to vary a cover surface of the third plurality of orifices on the first plurality of orifices and/or the second plurality of orifices.

8. The method according to the preceding claim 7 wherein the passage surface between the storage volume and the outside of the device is defined by the combination of the relative rotation of the additional sleeve and one of the outer sleeve and the inner sleeve and the relative translation along the longitudinal axis of the outer sleeve and the inner sleeve.

9. The device according to claim 2, wherein the orifices of the plurality of orifices of at least one sleeve are at least partially hexagonal in shape.

10. The device according to claim 3, wherein the orifices of the plurality of orifices of at least one sleeve are at least partially hexagonal in shape.

11. The device according to claim 2, wherein the locking element has a hook on one of the outer sleeve and the additional sleeve and a plurality of detents on the other of the outer sleeve and the additional sleeve, such that the outer sleeve is fastened on the additional sleeve in a stationary position through the cooperation between the hook and a detent of the plurality of detents.

12. The device according to claim 3, wherein the locking element has a hook on one of the outer sleeve and the additional sleeve and a plurality of detents on the other of the outer sleeve and the additional sleeve, such that the outer sleeve is fastened on the additional sleeve in a stationary position through the cooperation between the hook and a detent of the plurality of detents.

13. The device according to claim 4, wherein the locking element has a hook on one of the outer sleeve and the additional sleeve and a plurality of detents on the other of the outer sleeve and the additional sleeve, such that the outer sleeve is fastened on the additional sleeve in a stationary position through the cooperation between the hook and a detent of the plurality of detents.

14. The device according to claim 5, wherein the locking element has a hook on one of the outer sleeve and the additional sleeve and a plurality of detents on the other of the outer sleeve and the additional sleeve, such that the outer sleeve is fastened on the additional sleeve in a stationary position through the cooperation between the hook and a detent of the plurality of detents.

15. A method for adjusting the cover surface of the device according to claim 2, comprising successively at least the following steps:
   relative translation of the inner sleeve and the outer sleeve along the longitudinal axis so as to reach a position corresponding to a desired level of a cover surface; and
   immobilisation of the outer sleeve in said position.

16. A method for adjusting the cover surface of the device according to claim 3, comprising successively at least the following steps:
   relative translation of the inner sleeve and the outer sleeve along the longitudinal axis so as to reach a position corresponding to a desired level of a cover surface; and
   immobilisation of the outer sleeve in said position.

17. A method for adjusting the cover surface of the device according to claim 4, comprising successively at least the following steps:

relative translation of the inner sleeve and the outer sleeve along the longitudinal axis so as to reach a position corresponding to a desired level of a cover surface; and immobilisation of the outer sleeve in said position.

18. A method for adjusting the cover surface of the device according to claim 5, comprising successively at least the following steps:

relative translation of the inner sleeve and the outer sleeve along the longitudinal axis so as to reach a position corresponding to a desired level of a cover surface; and immobilisation of the outer sleeve in said position.

\* \* \* \* \*